United States Patent [19]

Pinkos

[11] Patent Number: 5,436,044
[45] Date of Patent: Jul. 25, 1995

[54] CARGO SECUREMENT STRAP

[75] Inventor: John L. Pinkos, Chepachet, R.I.

[73] Assignee: Elizabeth Webbing Mills, Inc., Central Falls, R.I.

[21] Appl. No.: 982,139

[22] Filed: Nov. 25, 1992

Related U.S. Application Data

[63] Continuation of Ser. No. 697,972, May 10, 1991, abandoned, which is a continuation-in-part of Ser. No. 675,293, Mar. 26, 1991, which is a continuation-in-part of Ser. No. 568,270, Aug. 15, 1990, abandoned.

[51] Int. Cl.[6] ............................ B66C 3/00; B66C 1/12
[52] U.S. Cl. ............................ 428/36.1; 428/193; 294/74; 414/785; 57/31; 139/411; 139/383 R; 139/384 R; 139/387 R
[58] Field of Search .................. 294/74; 139/411, 383, 139/384 R, 387 R; 57/201, 31; 428/36.1, 193; 414/785

[56] References Cited

U.S. PATENT DOCUMENTS

| | | | |
|---|---|---|---|
| 2,194,038 | 6/1939 | Wallace, Jr. | 139/383 |
| 3,472,288 | 10/1969 | Kohlhagen | 139/387 |
| 4,018,960 | 4/1977 | Berger et al. | 428/193 |
| 4,148,957 | 4/1979 | Berger et al. | 428/193 |
| 4,174,738 | 11/1979 | Berger et al. | 139/384 R |
| 4,421,352 | 12/1983 | Raue et al. | 294/74 |
| 4,600,626 | 7/1986 | Ogata | 428/193 |
| 4,750,529 | 6/1988 | Watanabe | 139/383 |
| 4,800,929 | 1/1989 | Watanabe | 139/383 |
| 4,843,807 | 7/1989 | von Danwitz | 57/201 |
| 4,850,629 | 7/1989 | St. Germain | 294/74 |
| 4,856,837 | 8/1989 | Hammersla, Jr. | 294/74 |
| 4,900,596 | 2/1990 | Peacock | 428/34.5 |
| 4,940,820 | 7/1990 | Pithouse et al. | 428/34.9 |
| 4,981,161 | 1/1991 | Pickering et al. | 139/383 |

FOREIGN PATENT DOCUMENTS

| | | | |
|---|---|---|---|
| 766660 | 9/1967 | Canada | 294/74 |
| 798197 | 11/1968 | Canada | 294/74 |
| 319847 | 3/1902 | France | 139/383 |
| 8908740 | 6/1989 | France | 74/2325 |
| 3141090 | 11/1983 | Germany . | |
| WO84/02510 | 12/1983 | WIPO | B66C 1/18 |

OTHER PUBLICATIONS

1966, What Makes a Body–Guard Sling Cut Resistant, Wear–Flex Corporation (Advertisement and Brochure).
Military Specification, United States Government, MIL-83144A (USAF), Amendment 2, Nov. 16, 1982.
Military Specification, United States Government, MIL-83144A(USAF), Amendment 3, Jun. 8, 1988.
AIAA 8th Aerodynamic Decelerator and Balloon Technology Conference, "Development of New Ribbons and Webbings for High Performance Parachutes", R. H. Ericksen, D. W. Johnson and T. R. Guess, Apr., 1984.

*Primary Examiner*—Charles R. Nold
*Attorney, Agent, or Firm*—Wolf, Greenfield & Sacks

[57] ABSTRACT

A novel woven webbing having improved resistance to cutting is provided. The webbing has edges adapted to resist cutting by absorbing the initial impact of a force applied to the webbing edge. The woven webbing may have a nontubular central region and at least one tube attached along the length of the central region and defining at least one edge of the webbing.

26 Claims, 5 Drawing Sheets

CARGO SECUREMENT STRAP

RELATED APPLICATIONS

This application is a continuation, of application Ser. No. 07/697,972, filed May 10, 1991, now abandoned, which is a continuation-in-part application of U.S. application Ser. No. 07/675,293, filed Mar. 26, 1991 and entitled "Cut Resistant Strap", pending which in turn is a continuation-in-part application of U.S. application Ser. No. 07/568,270, filed Aug. 15, 1990, now abandoned and also entitled "Cut Resistant Strap". The entire disclosure of each of the foregoing applications is expressly incorporated herein by reference.

FIELD OF THE INVENTION

This invention relates generally to straps for supporting or restraining various objects, and more particularly to a woven strap having an improved edge.

BACKGROUND OF THE INVENTION

Figure 1:
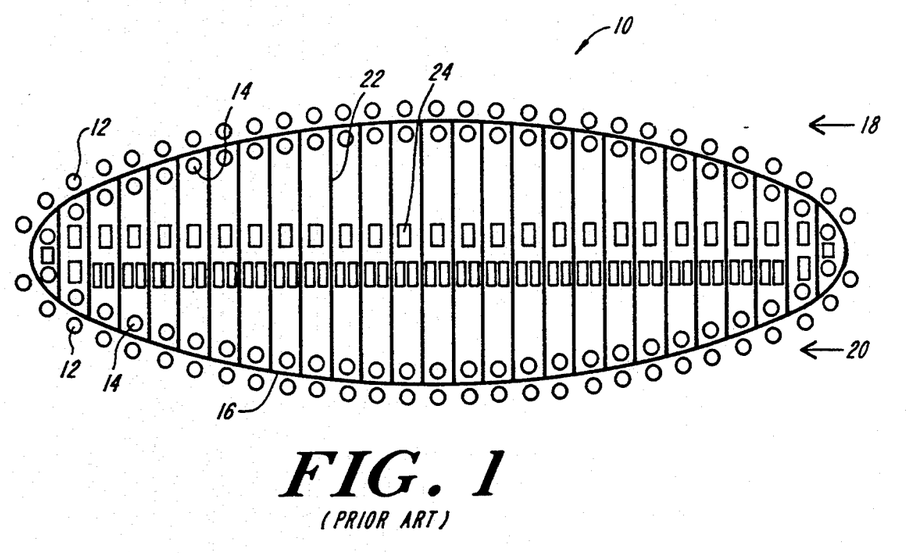
FIG. 1 is a sectional view of a prior art strip of webbing material.

Woven webbings have long been used as straps and slings for luggage handles, child restraints, animal harnesses, and for securing or supporting various objects. A typical prior art, woven strap is shown in FIG. 1. The woven strap 10 typically is formed by weaving a tube from warp yarns 12, 14 and a weft yarn 16, and then flattening the tube to form a 2-ply woven strap. The two plies 18, 20 are woven together by binder yarns 22. Stuffer yarns 24 typically are sandwiched between the two-plies 18, 20 for increasing the overall strength and/or thickness of the woven strap 10.

When such straps are used as a cargo-securement device such as a cargo tie-down or sling, the edges of the straps often come into contact with sharp objects which can abrade and/or cut the edges, causing the strap to tear or break. U.S. Pat. No. 4,856,837 discloses a two-ply woven cargo sling designed to resist tearing or breaking of the sling. According to the '837 patent, the edges of the sling are strengthened relative to the central region by weaving vinyl-coated yarns along the edges. These strengthened yarns are said to improve the sling by making the edges more resistant to abrasion and cutting. This approach has the drawback of requiring special, strengthened material along the edges of the sling, thereby increasing the cost of manufacturing the sling. It also has the drawback of stiffening the edges of the sling relative to the central region, thereby making the sling less suitable for human or animal contact (if such a sling were to be used in certain contexts other than as slings).

Accordingly, it is an object of the invention to provide an improved strap of woven webbing having edges which effectively resist abrasion and cutting.

It is a particular object of the invention to provide an improved tie-down, load restraint web or sling having cut resistant edges.

Another object of the invention is to provide a strap of woven webbing having soft, flexible edges suitable for contact with a human or animal.

Another object of the invention is to provide a strap of woven webbing that has uniform elongation properties across its cross-section.

Yet another object of the invention is to provide a strap of woven webbing having the foregoing properties which is simple and economical to manufacture.

SUMMARY OF THE INVENTION

These and other objects are achieved by the invention which provides a strip of woven material having increased resistance against cutting and abrading, while also having added softness along its edges thereby enhancing safety and comfort when the strip contacts humans or animals.

According to one aspect of the invention, a length of woven material defines an edge relative to a central region, the edge being adapted to deform when a force transverse to the length is applied to the edge. Preferably there are two edges. The edges are constructed and arranged to be softer or more deformable than the central region between the edges. Surprisingly, even though the edges are softer or more deformable, the edges have improved cut resistance.

In one preferred embodiment, a strip of woven web material has a nontubular central region defining a length, and a tube attached along the length defining an edge. The tube may be woven of the same material as the central region. The tube may be filled or unfilled.

In one particularly preferred embodiment, the strip of woven material has a break strength of at least about 4500 lbs., and most preferably about 10,000 lbs. or more. In this embodiment, it also is preferred that the strip be made of polyester, nylon or bulked nylon, have a width of at least 1¾ inches, and have a weight of at least 15 lbs. per 100 yards. Such devices are particularly suitable as cargo-securement straps.

According to another aspect of the invention, a method for making a strip of woven web material as defined above is provided. A tube is continuously woven from warp and weft fibers. The tube is flattened and opposing plies are bound to form a two-ply central region and at least one tubular region defining an edge. This tubular edge is capable of deforming relative to the central region when a force is applied to the edge transverse to the length.

According to still another aspect of the invention, a method for securing cargo to a support for the cargo is provided. Strips of the web material of the invention are used to tie-down or otherwise secure cargo to a cargo support. Cargo secured by such web material also represents an aspect of the invention.

BRIEF DESCRIPTION OF THE DRAWINGS

The foregoing objects and advantages of the present invention will be more clearly understood in connection with the the accompanying drawings in which.

DETAILED DESCRIPTION OF THE PREFERRED EMBODIMENTS

Figure 2:
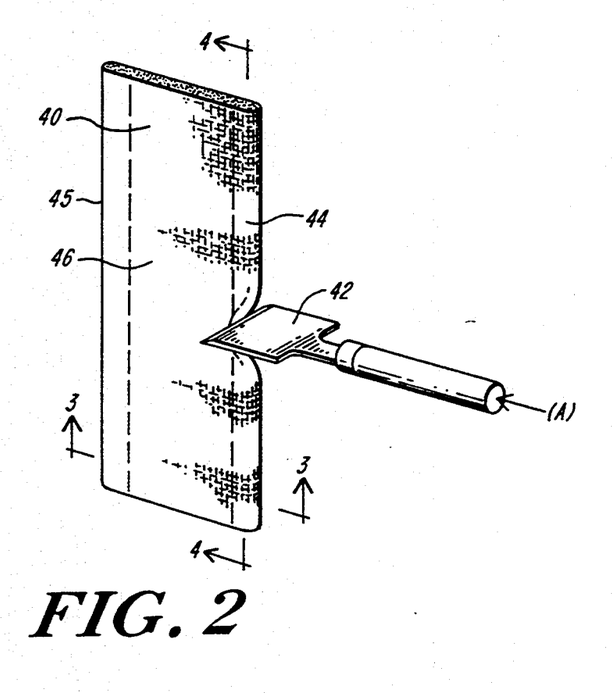
FIG. 2 is a perspective view of a strip of woven webbing material made according to the invention and held under tension with a force being applied transverse to the length.

Referring to FIG. 2, a woven webbing strap 40 according to the invention is shown under tension and with a force being applied transverse to the length of the strap 40. The force is applied by a knife 42. As can be seen, the edge 44 of the strap 40 deforms relative to the central region 46 when the knife 42 is contacted against the edge 44 using a force transverse to the length of the strap 40. This deformation allows the edge of the strap to 'give' under the force of the knife 42, thereby causing the edge 44 of the strap 40 to absorb some of the force of the contact with the knife 42. The cut resistance of the edge 44 is thus improved. At the same time, the edge is softer due to its ability to 'give' when a force is applied to the edge. Because the edge is softer (rather than stiffer as is characterized by the prior art cut resistant edge), it is less likely to cut or injure a human or animal when the strap is under tension and is put to uses involving contact with human or animal skin (e.g., seat-belts, child restraints, harnesses).

Figure 3:
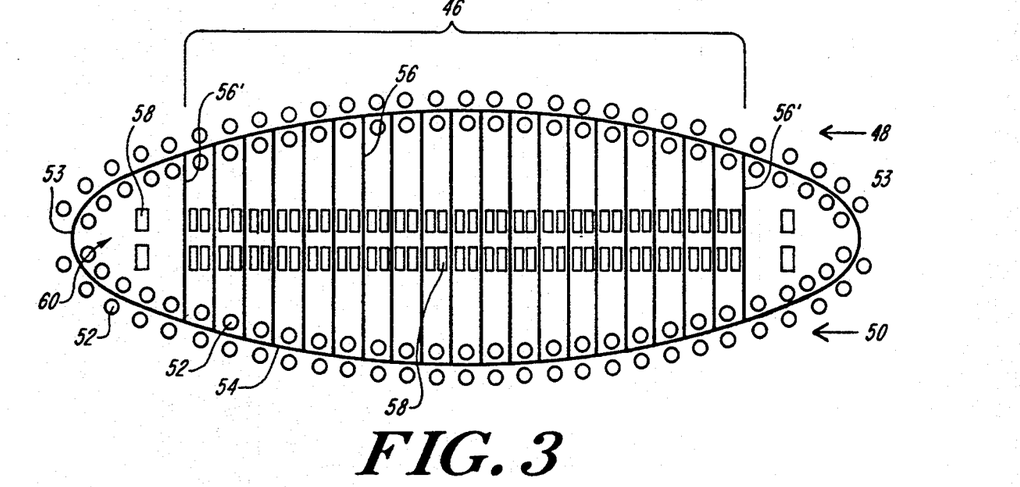
FIG. 3 is a cross-sectional view taken along line 3—3 of the woven webbing of FIG. 2.
Figure 4:
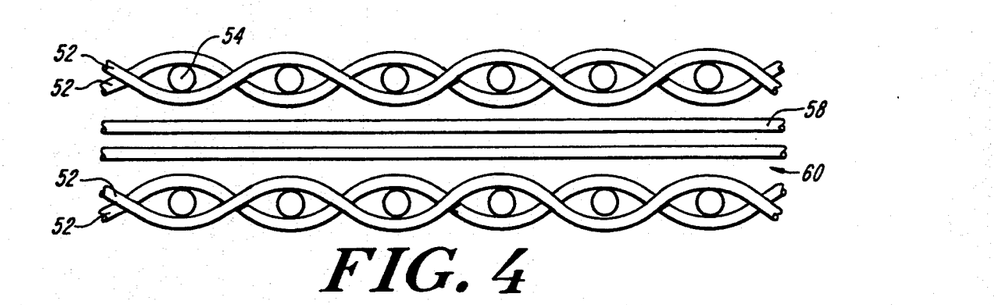
FIG. 4 is a sectional view taken along line 4—4 of the woven webbing of FIG. 2.

Referring to FIG. 3, the woven strap 40 has an upper ply 48 and a lower ply 50. The upper and lower plies 48, 50 are formed of warp yarns 52 continuously woven with weft yarns 54. The upper and lower plies 48, 50 are bound together only along the central region 46 by binder yarns 56 in a conventional manner. The upper and lower plies are unbound along their periphery, thereby forming a pair of tubes 60 defining the opposing edges of the strap 40. Stuffer yarns 58 are sandwiched between the upper and lower plies 48, 50 and are bound in place in the central region 46 by the binder yarns 56. The stuffer yarns 58 also are contained in the tubes 60.

For the purposes of this invention, for two-ply webs having a width greater than or equal to one inch, a tubular edge is present when the width of the tubular edge, defined as the distance when the two plies are in face to face relation (i.e. the tube is flattened) between the outermost edge 53 of the web and the binder yarn 56' closest to the outermost edge 53, is at least about 3/16 of an inch, and preferably is at least ¼ of an inch. Alternatively, a tube may be considered present if the width of the tubular edge substantially exceeds the average distance between the binders in the web.

For the purposes of this invention, for two-ply webs, a nontubular central region is one having at least six binders per inch, and preferably at least 12 binders per inch. Alternatively, a nontubular central region is present if the width of the tubular edge substantially exceeds the average distance between the binders in the web.

It also is intended that strips of webbing having tubular edges and one-ply central regions are within the scope of the invention.

For webs having a pair of tubes along opposing edges, preferably the combined width of the tubes is equal to at least about 25% of the overall width of the web. Moreover, preferably the number of warp ends in the tubes as a percentage of the total warp ends in the web varies in a range from about 25% to 65%.

The following table illustrates examples of webbing having a pair of tubes along opposing edges, indicating the overall width of the web, the width of the individual tubes and the percentage represented by the combined width of the tubes vs. the overall width of the strap. The table also indicates the total number of warp ends in the web, the combined total number of warp ends in the two tubes and the percentage represented by the combined total of warp ends in the tubes vs. the total number of warp ends in the web.

| WEB WIDTH | TUBE WIDTH | PERCENTAGE TUBES/WEB | TOTAL ENDS | ENDS IN TUBES COMBINED | PERCENTAGE TUBES/TOTAL |
|---|---|---|---|---|---|
| 4" | ½" | 25% | 217 | 77 | 35% |
| 4" | ½" | 25% | 217 | 77 | 35% |
| 2" | ¼" | 25% | 112 | 47 | 42% |
| 1¾" | ⅜" | 42% | 165 | 56 | 34% |
| 2" | ¼" | 25% | 105 | 37 | 35% |
| 1¾" | 5/16" | 36% | 236 | 61 | 26% |
| 1½" | 7/32" | 29% | 194 | 80 | 41% |
| 1" | ¼" | 50% | 169 | 85 | 50% |
| ¾" | 7/32" | 58% | 138 | 90 | 65% |
| ¾" | ¼" | 40% | 106 | 58 | 55% |

Figure 5:
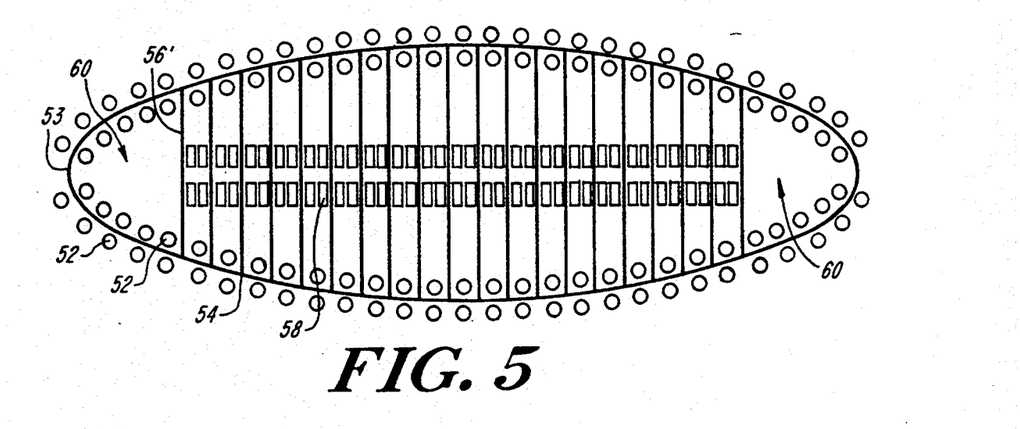
FIG. 5 is a sectional view of a second embodiment of the invention.

The strap 40 is formed preferably by continuously weaving a tube from the warp yarns 52 and weft yarns 54, and then flattening the tube to form a two-ply strap. Binder yarns 56 are woven continuously to bind the two plies to one another only in the central region 46 of the strap 40. The upper and lower plies 48, 50 of the strap 40 are not woven to one another by binder yarns 56 along their edges, and therefore a pair of tubes are formed along opposing edges 44, 45 of the strap 40. These tubes may include various materials such as stuffer yarns 58 or other reinforcing or strengthening materials, or may be unfilled (FIG. 5). Virtually any material may be included in the tubes 60, ideally so long as that material does not significantly affect the ability of the edges to deform relative to the central region when a force is applied to the edges transverse to the length of the strap. It will be understood, however, that if the tubes carry a strengthening material, the ability of the tubes to deform may be compromised somewhat. In this instance, certain benefits of the invention may not be achieved, although others will be achieved, and such embodiments are intended to be encompassed.

The strap 40 may be woven with conventional machinery used for manufacturing woven straps. Such machinery is well known to those of ordinary skill in the art and is commercially available. In essence, the prior art manufacturing technique may be followed, with the exception that the binder yarns which typically are present at the edges of a two-ply strap are removed so that a strap having tubes at opposing edges is formed.

Figure 6:
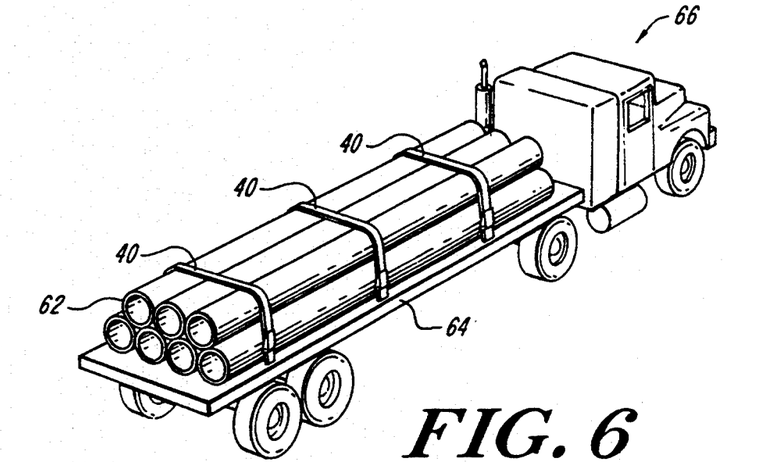
FIG. 6 is a schematic illustration of strips of woven webbing material according to the invention used to secure cargo to a truck.

The straps of the invention are particularly useful in situations where cut resistance is important, such as in tying down cargo with straps or supporting cargo with a sling. As used herein, the term cargo securement strap is intended to include tie downs, such as motorcycle tie downs, cargo tie downs, snowmobile tie downs, boat tie downs, car top tie downs, vehicle securement tie downs and tie downs used with a tow dolly. Generally, a tie down is a device used to secure cargo being transported such as on a trailor, train, boat, plane, etc. The term also is intended to include a tow-straps, winch straps and slings. Cargo securement straps are of defined length, depending upon the particular usage, and it should be understood that length may vary widely. Referring to FIG. 6, straps 40 according to the invention are shown securing a load of stacked logs 62 to the cargo-support bed 64 of a truck 66.

A preferred embodiment of the invention is a tie-down web having a width of 2 inches and made of polyester fibers. The webbing has a weight per hundred yards of about 19 lbs., an elongation at 60% of break strength of about 11% and a break strength of about 10,000 lbs. Another preferred embodiment 8s a tie-down web having a width of four inches and made of polyester fibers. This tie-down web has a weight per 100 yards of about 39 lbs., an elongation at 60% break strength of about 12% and a break strength of about 20,000 lbs. These preferred 2 inch and 4 inch tie-down webs have warp yarns of 1,000 denier, 3-ply; binder yarns of 1,000 denier, 1-ply; stuffer yarns of 1,000 denier, 7-ply; and filling yarns of 1,000 denier, 1-ply.

A preferred sling webbing according to the invention has a width of 2 inches and is formed of nylon. It has a weight per 100 yards of about 26 lbs., an elongation at break strength of about 22%, and a break strength of about 13,600 lbs. The sling webbing is made of yarns having the following characteristics: warp yarns of 1680 denier, 1 ply; binder yarns of 1680 denier, 1 ply; stuffer yarns of 1680 denier, 1 ply; and filling yarns of 1680 denlet, 1 ply.

Yet another preferred embodiment is a cargo control strap having a width of two inches and formed from bulked nylon/polyester. The cargo control strap has a weight per 100 yards of about 12 lbs., an elongation at 60% break strength of about 10%, and a break strength of 4,500 lbs. The cargo control strap is formed of yarns having the following characteristics: bulked nylon warp yarns of 1,900 denier, 1 ply; bulked nylon binder yarns of 1,900 denier, 1 ply; polyester stuffer yarns of 1,000 denier, 2-ply; and polyester filling yarns of 1000 denier, 1-ply.

Cargo securement straps and in particular tie-downs are typically used with securement hardware such as end fittings, flat hooks, delta rings, "J" hooks, "S" hooks and snap hooks. Such securement hardware also includes buckles and rachet assemblies. Such hooks and attachment hardware typically define an opening through which the webbing is passed whereby the webbing may be turned back upon itself and sewn to attach the hardware to the webbing.

Slings are used for lifting heavy objects. Slings may be used with or without hardware. Hardware typically used with slings includes chokers, triangular rings, and bridal sling hardware. In certain slings, hardware is entirely absent. Instead, the end of the webbing simply is turned back upon itself and sewn to form a loop which can be used for mechanical engagement purposes. Such looped ends include flat-eye ends, reversed eye ends and twisted eye ends.

Figures 7, 8:
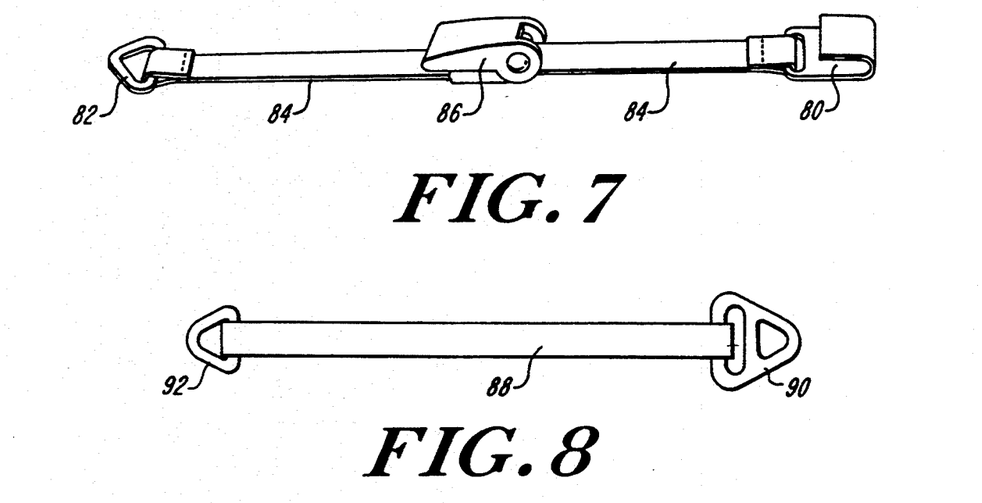
FIG. 7 is a perspective view of a tie down including hardware.
FIG. 8 is a perspective view of a sling including hardware.

FIG. 7 shows a tie-down having attached to it securement hardware. At one end of the tie-down is a flat hook 80 and at the other end of the tie-down is a delta ring 82. In the middle of the tie-down and connecting the strips of woven webbing 84 according to the invention is a rachet assembly 86.

FIG. 8 shows a sling according to the invention including securement hardware. The sling includes a strip of woven webbing 88 according to the invention with a choker 90 at one end of the sling and a triangle 92 at the opposite end.

Figure 9:
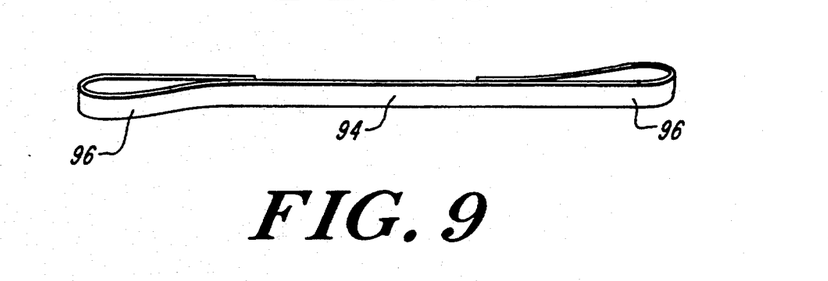
FIG. 9 is a perspective view of a sling having looped ends, but without hardware.

FIG. 9 depicts a sling including a strip of woven material 94 according to the invention with looped ends 96 at opposite ends of the sling.

The improvement in cut resistance of the strap of the invention is surprising. The prior art approach to improving cut resistance was to add material to the edges and in particular add a stronger, reinforced material to the edges. According to one aspect of the invention, material has been removed from the edges and the edges have been made in some respects weaker than the central region. The strap of the invention thus is characterized in certain embodiments by a central region having a greater number of fibers per unit area of cross-section as compared to the same unit area of cross-section for the edges.

EXAMPLE I

Tie-Down

A 4 inch tie-down was woven in general as described above. The tie-down had a 3 inch, 2-ply, central nontubular portion and a pair of ⅛ wide tubes woven lengthwise to the central nontubular portion. The tubes were filled, with two ends floating freely within the tube formed along the needle edge and four ends floating freely within the tubes along the opposite edge. The tie-down had a weight per 100 yards of about 38 lbs., and elongation at 60% of break strength of less than 18% and a break strength of about 20,000 lbs. The yarns were as follows: The warp yarn was polyester, 1000 denier, 3-ply; the binder yarns were polyester, 1000 denier, 1-ply; the stuffer yarns were polyester, 1000 denier, 7-ply; the weft yarns were polyester, 1000 denier, 1-ply; and the catch cord was Nylon, 420 denier. The yarn strength of the polyester was a minimum of 8.9 grams per denier and the yarn strength of the Nylon was at least 7.7 grams per denjer. The polyester yarn had a twist of 2½ turns per inch and an elongation at break of 14%.

Figure 10:
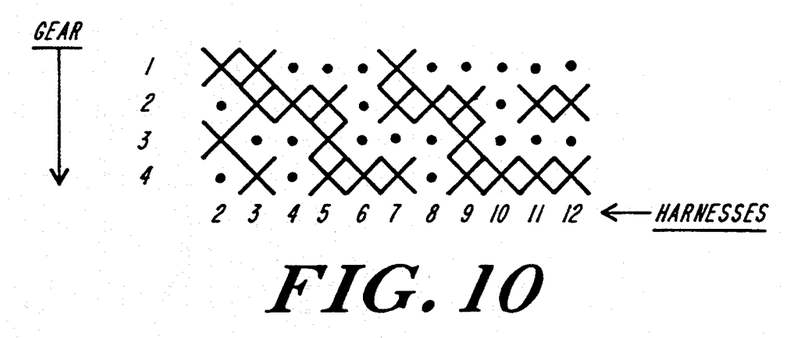
FIG. 10 is a diagram of the chain draft for the weave according to Example I.

The type of weave for the body was as follows: A 3-1 regular weave for the warp; a 1-1 weave for the binder; and a 1-1 weave for the stuffer (floating, reverse of binder). The edge weave was a 3-1 regular weave for the warp and a 1-1 weave for the stuffer. The edge contained no binder. To manufacture the weave, the reed size was 10.5 dents per inch and the reed type was M-2. The body had 140 warp end, 37 binder ends, 90 stuffer ends, and 15 weft picks (finishes to 16 picks). The needle edge had 39 warp ends and two stuffer ends. The opposite edge had 38 warp ends and four stuffer ends. The chain draft is depicted in FIG. 10. The gears are shown on the vertical axis and the harnesses are shown on the horizontal axis. Harness No. 2 is for the binder, harnesses 3-10 are for the regular weave, and harnesses 11 and 12 are for the two stuffers. Harness 1 was skipped, and X indicates "up pick" and a "." indicates a "down pick". The loom was an N.C. High Shed Loom by Mueller, Germany.

Figure 11:
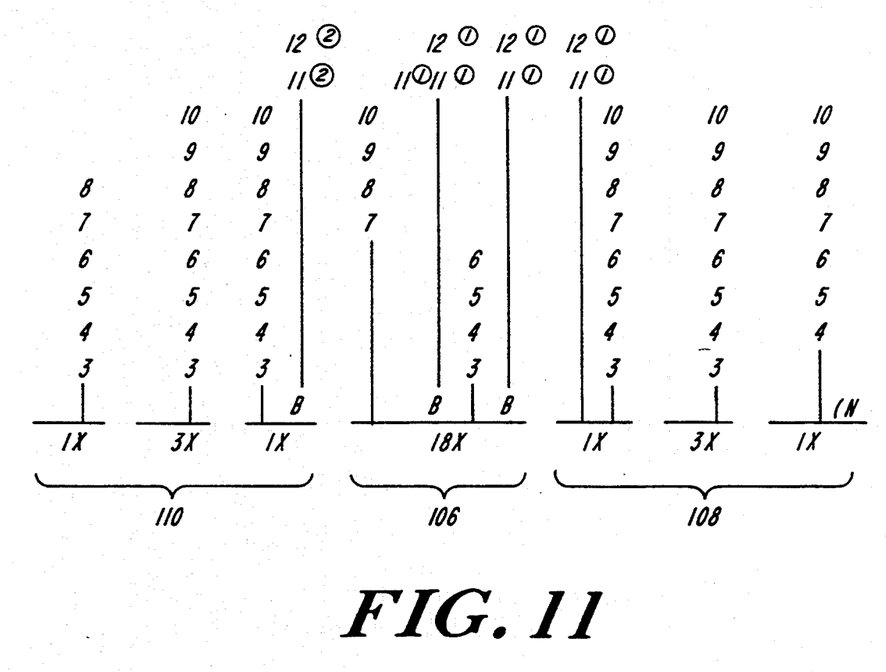
FIG. 11 is a diagram of the loom draft for the weave according to Example I.

FIG. 11 depicts the loom draft. The body is indicated by bracket 106, the needle side tube is indicated by bracket 108 and the opposite tube is indicated by bracket 110. The numbers contained within circles refer to stuffers. B refers to binder and N refers to needle side.

The tie-down after being woven was treated with the following dye composition. 12 lbs. of Eccobrite Yellow, Eastern Color, RI; 120 lbs. of an Polyerethene Emulsion sold under the trade name Solucote 1016, Soluol, RI; 120 lbs. of an Acrylic Emulsion sold under the trade name Duraseal P-23, Scholler, PA; and 6 lbs. of an Alkylaryl polyether alcohol sold under the trade name Orcowet PA, Organic, RI and water sufficient to form a 280 gallon mix.

The material was woven on the loom to a width of 47/16 inches wide, and had a width of 4 inches after the following treatment. The woven material was introduced into a padder containing the dye composition. The dwell time in the padder was 2 seconds and the dwell temperature was room temperature (20% pickup was achieved). The material then was cured and dried in a hot air dryer at a temperature of 325° F. for 8 minutes in order to fix the dye. The speed of the material both at the padder and before entrance to the oven was 12.6 yds/min. This treatment provided color, stiffness and enhanced abrasion resistance.

EXAMPLE II

Vehicle Securement

A 2 inch vehicle securement webbing was woven in general as described above. The securement had a 1½ inch, 2-ply, central non-tubular portion and a pair of ¼ inch wide tubes woven length-wise to the central non-tubular portion. The tubes were hollow. The securement webbing had a weight per 100 yards of about 20 pounds, an elongation at 50 percent of break strength of less than 18 percent and a break strength of about 12,000 pounds. The yarns were as follows: the warp yarn was polyester, 1000 denier, 3-ply; the binder yarns were polyester, 1000 denier, 1-ply; the stuffer yarns were polyester, 1000 denier, 7-ply; the weft yarns were polyester, 1000 denier, 1-ply; and the catch cord was nylon, 210 denier. The yarn strength of the polyester was a minimum of 8.9 grams per denier and the yarn strength of the nylon was at least 7.7 grams per denier. The polyester yarn had a twist of 2½ turns per inch and an elongation at break of 14 percent.

Figure 12:
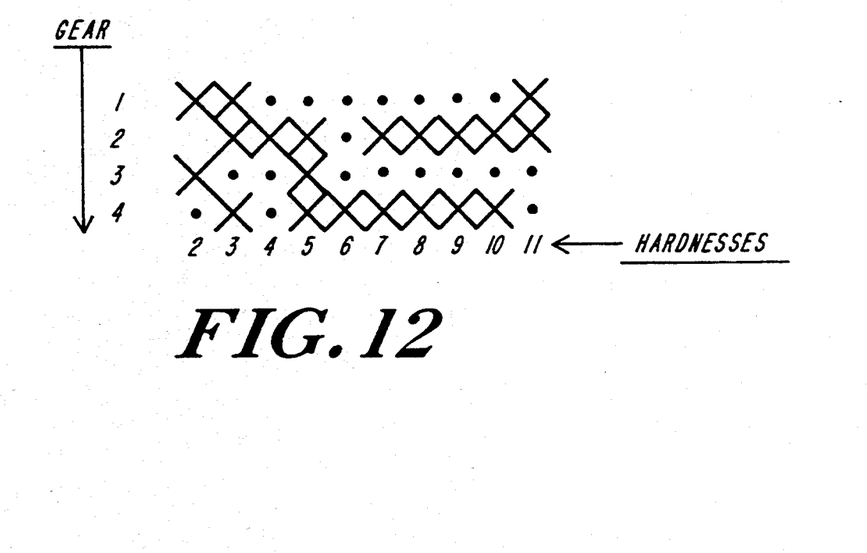
FIG. 12 is a diagram of the chain draft for the weave according to Example II.

The type of weave for the body was as follows: a 3-1 regular weave of the warp, a 1-1 weave for the binder; one binder with a 2-2 weave on the edge opposite the needle, being the last binder before the tube; and a 1-1 weave for the stuffer (floating, reverse of binder). The edge contained no binder or stuffer. To manufacture the weave, the reed size was 10 dents per inch and the reed type was M-2. The body had 65 warp ends, 19 binder ends, 72 stuffer ends and 15 weft picks (finishes to 16 picks). The needle edge had 22 warp ends. The opposite edge had 25 warp ends. The chain draft is depicted in FIG. 12. The gears are shown on the vertical axis and the harnesses are shown on the horizontal axis. Harness No. 2 was for the binder, Harnesses 3-6 were for the regular weave, Harnesses 7-10 were for the stuffers, and Harness No. 11 was for the 2-2 binder. Harness 1 was skipped. An X indicates "up pick" and a "." indicates "down pick". The loom was a NC-280 Loom by Mueller, Germany.

Figure 13:
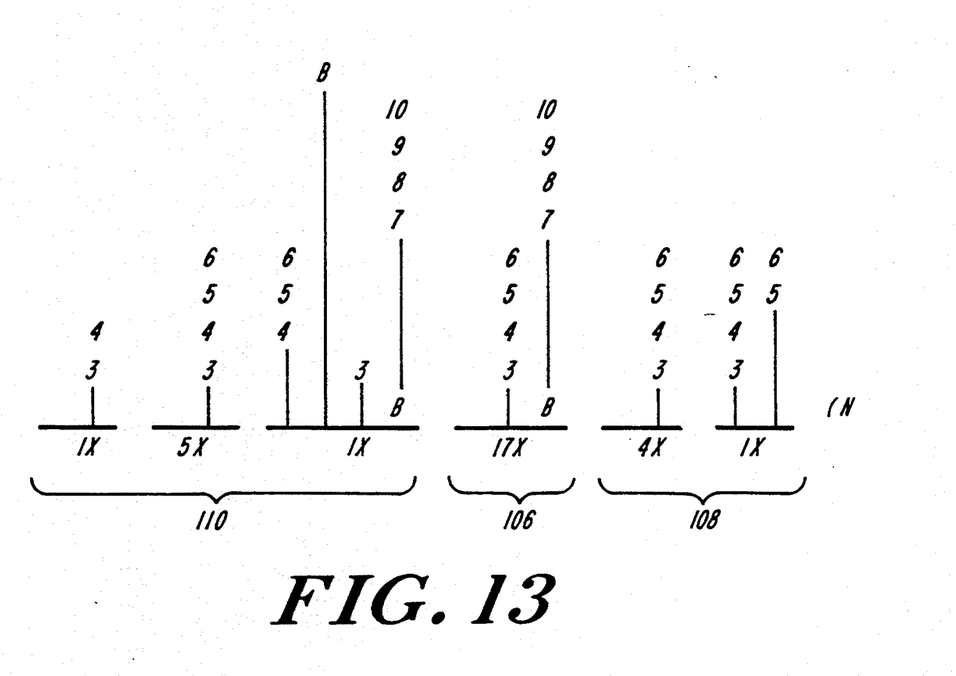
FIG. 13 is a diagram of the loom draft for the weave according to Example II.

FIG. 13 depicts the loom draft. As was the case with FIG. 11, the body is indicated by bracket 106, the needle side tube is indicated by bracket 108, and the opposite side tube is indicated by bracket 110. B refers to binder and N refers to needle side.

The vehicle securement webbing after being woven was treated with the following dye composition. 2000 grams of Eccobrite Yellow, Eastern Color, RI; 100 pounds of a 45 percent polyurethene emulsion resin sold under the trade name Solucote 1017, Soluol, RI; 80 pounds of a 33 percent polymeric paraffin wax emulsion sold under the trade name Nomar 70, Michelman Inc., OH; and 1000 grams of a 25 percent Alkylaryl Polyether Alcohol sold under the trade name Orocwet PA, Orangic, RI and water sufficient to form a 100 gallon mix.

The material was woven on the loom to a width of 2⅛ inch, and had a width of 2 inches after the following treatment. The woven material was introduced into a padder containing the dye composition. The dwell time in the padder was 2 seconds and the dwell temperature was room temperature (20 percent pick up was achieved). The material then was cured and dried in a hot air dryer at a temperature of 350 degrees F. for 8 minutes in order to fix the dye. The treatment provided color, improved abrasion resistance against sharp objects, and improved flat abrasion.

It should be understood that the preceding is merely a detailed description of certain preferred embodiments; and it will be apparent to those of ordinary skill in the art that various modifications and equivalents can be made without departing from the spirit or scope of the invention. For example, although the preferred embodiment describes edges woven of the same material as the central region of the strap, the edges also may be woven of a different material. If the edges are formed of a material that is stronger than the material of the central region, then the edges still must be configured in a manner such that the edge deforms relative to the central region when a force is applied transverse to the length.

What is claimed is:

1. A cargo securement strap with improved cut resistance comprising:
   a non-tubular central region of woven web material defining a length,
   a first tubular region along a first edge of said length, and
   a second tubular region along a second edge of said length opposing said first edge,
   wherein said tubular regions are of a sufficient width such that said tubular regions are substantially more deformable than said non-tubular central region when subjected to a force transverse to said length.

2. A strap as in claim 1 wherein said non-tubular central region is two-ply.

3. A strap as in claim 2 wherein said strap is formed by continuously weaving an intermediate tube,
   flattening said intermediate tube so as to create two opposing plies defining a length, and
   binding together only a central region of the width of said opposing plies so as to form a central two-ply non-tubular region and two tubular regions along opposing edges of said length.

4. A strap as in any one of claims 1–3 further comprising a plurality of binder yarns woven into said web, said binder yarns substantially parallel to one another and substantially parallel to said length,
  wherein the width of each said tubular region substantially exceeds the average distance between adjacent binder yarns in said strap.

5. A strap as in any one of claims 1–3 wherein said sufficient width is a combined width of said tubular regions of at least about ¼ the width of said strap.

6. A strap as in any one of claims 1–3 wherein said strap comprises a multiplicity of warp ends interwoven with a multiplicity of weft ends and
  wherein said sufficient width is such that the combined number of warp ends in said tubular regions is at least about ¼ the number of warp ends in said strap.

7. A strap as in claim 5 wherein the width of said central region is at least about 40% of the width of said strap.

8. A strap as in claim 6 wherein the number of warp ends in said central region is at least about 35% of the total number of warp ends in said strap.

9. A strap as in any one of claims 1–3 wherein said tubular regions are filled.

10. A strap as in claim 4 wherein said tubular regions are filled.

11. A strap as in claim 5 wherein said tubular regions are filled.

12. A cargo securement device comprising the strap of any one of claims 1–3 wherein at least one end of said strap has been formed into a closed loop.

13. A cargo securement device comprising the strap of claim 4 wherein at least one end of said strap has been formed into a closed loop.

14. A cargo securement device comprising the strap of claim 5 wherein at least one end of said strap has been formed into a closed loop.

15. A cargo securement device comprising the strap of any one of claims 1–3 wherein cargo securement hardware has been attached to said strap.

16. A cargo securement device comprising the strap of claim 4 wherein cargo securement hardware has been attached to said strap.

17. A cargo securement device comprising the strap of claim 5 wherein cargo securement hardware has been attached to said strap.

18. A cargo securement device as in claim 15 wherein the device is constructed and arranged as a tie-down.

19. A cargo securement device as in claim 15 wherein the device is constructed and arranged as a vehicle securement device.

20. A cargo securement device as in claim 15 wherein the device is constructed and arranged as a sling.

21. A method for securing cargo to a support for said cargo comprising:
  securing said cargo with a device which includes a strap characterized by
  a central region of woven web material defining a length,
  a first tubular region along a first edge of said length, and
  a second tubular region along a second edge of said length opposing said first edge,
  wherein said tubular regions are of a sufficient width such that said tubular regions are substantially more deformable than said non-tubular central region when subjected to a force transverse to said length.

22. A method as in claim 21 wherein the combined width of said tubular regions is at least about ¼ the width of said strap.

23. A method as in claim 21 wherein the combined number of warp ends in said tubular regions is at least about ¼ the total number of warp ends in said strap.

24. A method for hoisting cargo comprising:
  hoisting said cargo with a device which includes a strap characterized by
  a non-tubular central region of woven web material defining a length,
  a first tubular region along a first edge of said length, and
  a second tubular region along a second edge of said length opposing said first edge,
  wherein said tubular regions are of a sufficient width such that said tubular regions are substantially more deformable than said non-tubular central region when subjected to a force transverse to said length.

25. A method as in claim 24 wherein the combined width of said tubular regions is at least about ¼ the width of said strap.

26. A method as in claim 24 wherein the combined number of warp ends in said tubular regions is at least about ¼ the total number of warp ends in said strap.

* * * * *